March 1, 1960  K. N. MAIERSHOFER  2,926,583
OBJECTIVE FOR MIRROR REFLEX CAMERAS
Filed Dec. 4, 1952

INVENTOR.
KARL N. MAIERSHOFER
BY Richards & Geier
ATTORNEYS

United States Patent Office 2,926,583
Patented Mar. 1, 1960

2,926,583

OBJECTIVE FOR MIRROR REFLEX CAMERAS

Karl N. Maiershofer, Chicago, Ill., assignor to Optische Werke C.A. Steinheil Soehne G.m.b.H., Munich, Germany, a limited liability company of Germany Application December 4, 1952, Serial No. 324,067

Claims priority, application Germany June 11, 1952

2 Claims. (Cl. 95—64)

This invention relates to an objective for mirror reflex cameras which is provided with a diaphragm preselector having a preselector ring and a diaphragm ring.

Devices of this type known in prior art have the drawback that either it is not possible to set the diaphragm without a stepwise arrangement or that its manufacture and mounting are comparatively complicated.

An object of the present invention is to eliminate drawbacks of prior art constructions and to produce an objective which can be easily set without steps, the manufacture and mounting of which is easy and effective and which has other advantages set forth hereinafter.

Another object of the present invention is the provision of an objective which is so constructed that the diaphragm preselector ring can be conveniently rotated from each set position to any other desired position so that any desired diaphragm value can be conveniently set from any position of the ring, the new position being larger, or smaller, than the initially set diaphragm value.

Other objects of the present invention will become apparent in the course of the following specification.

In accomplishing the present invention it was found advisable to provide an objective for a mirror reflex camera which has a preselector ring, a diaphragm ring and a two-armed lever pivoted upon the preselector ring and so constructed that it constitutes a clamp for the continuously adjustable rotary preselector ring, said clamp being operable when a stop upon the diaphragm ring engages the lever.

In accordance with an embodiment of the inventive idea a preselector ring which can be always set by rotation to any desired position carries a two-armed lever which is so constructed that it locks the preselector ring after clockwise rotation of the diaphragm ring to the extent of a predetermined angle.

In accordance with a further embodiment of the invention the arrangement is such that the two-armed lever which is pivoted upon the preselector ring is swingable about an axis which is perpendicular to the axis of the objective and which intersects it, and that due to the provision of a stop upon the diaphragm ring the rotation of the diaphragm ring will cause the lever to swing only to such an extent that its other arm which may have the form of a stay or strut lever, or preferably a cam, will clamp upon an annular body extending parallel to the plane of the rings and having the same axis, such annular body being immovable and flat and thus providing for locking without steps.

In order to eliminate wear and tear to a substantial extent the annular clamping body, and preferably the cam or strut arm of the two-armed lever, are made of a hard material such as steel.

It is advantageous to provide an auxiliary device which operates the release of a photographic camera when the diaphragm ring reaches its clamping position.

The invention will appear more clearly from the following detailed description when taken in connection with the accompanying drawing showing, by way of example, a preferred embodiment of the inventive idea.

Figure 1:
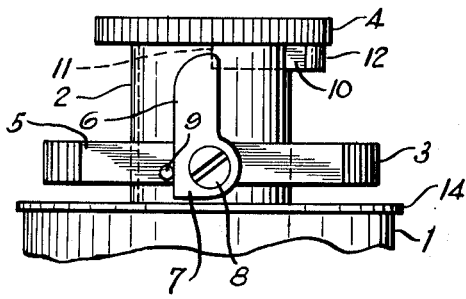
Figure 1 is a side view of the objective with a diaphragm selector device in the engaging position.

The drawing illustrates an objective 1 carrying a cylindrical member 2 provided with screw threads. A knurled preselector ring 3 and a diaphragm ring 4 which is also knurled are screwed upon the member 2. The preselector ring 3 has a flat portion 5 carrying a screw 8. A two-armed lever 6, 7 is pivotally mounted upon the screw 8 in such manner that it can swing about an axis which is perpendicular to the axis of the objective. The flattened portion 5 of the ring 3 also carries a stop-pin 9 which is located at a suitable distance from the lower arm 7 of the two-armed lever and which may engage this arm. The stop-pin 9 prevents the lever 6, 7 from swinging clockwise from the position shown in Figure 1 to an inclined position.

The diaphragm ring 4 carries a downwardly extending annular member 12 provided with an end surface 10 which serves as a stop adapted to engage the upper end of the arm 6 of the two-armed lever. Another end surface 11 of the member 12 is used to limit the rotation of the diaphragm ring 4 in the counterclockwise direction by engaging an immovable stop which is not shown in the drawing.

Figure 2:
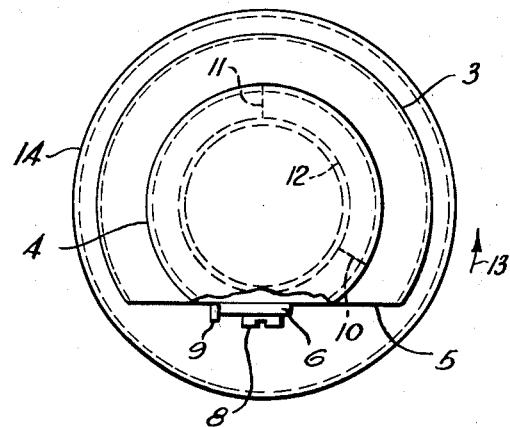
Figure 2 is a top view of the device shown in Figure 1.

The device is operated as follows:

Let it be assumed that it is necessary to operate the ring 3 from the position shown in Figure 1. Then the ring must be turned either in the direction indicated by the arrow 13 in Figure 2 or in the opposite direction until an arrow or other marking (not shown) upon the ring 3 is moved opposite the correct marking upon a scale (not shown) provided upon the objective 1. If the ring is rotated in the direction of arrow 13 it will move separately until the arm 6 of the two-armed lever strikes the surface 10. If there is further rotation, the diaphragm ring 4 will rotate along with the preselector ring 3. In both instances the lower portion 7 of the two-armed lever slides upon or directly above an annular clamping body 14 which is flat and which is made preferably of steel.

The rotation of the ring 3 from the position shown in Figure 1, in the direction of arrow 13 or in the opposite direction, is limited by stops in the usual manner.

Figure 3:
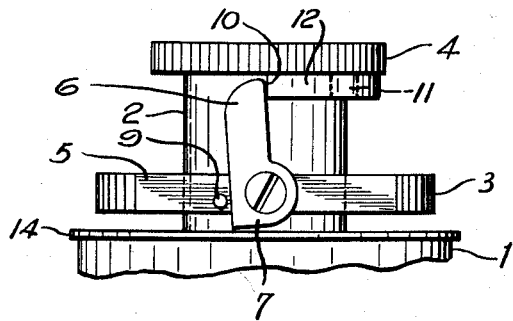
Figure 3 is similar to Figure 1 and shows the device in a clamping position.

If the diaphragm ring 4 is turned from the position shown in Figure 1 in a direction opposite to that of the arrow 13, until the surface 10 which turns along with the ring 4 strikes the arm 6 of the two-armed lever, then the two-armed lever will be swung into the position shown in Figure 3 in which the cam arm 7 of the two-armed lever is clamped against the clamping body 14 so that further rotation of the diaphragm ring opposite to the direction of arrow 13 becomes impossible.

On the other hand, when the diaphragm ring 4 is turned in the direction of the arrow 13 to its stop, the diaphragm will be completely open.

As already stated, the described objective is so constructed that a suitable selection of the diaphragm position is made possible in a most simple and effective manner from any position of the rings 3 and 4, while at the same time the diaphragm ring 4 can be rotated most effectively in the direction opposite to that of arrow 13 until the clamping of the two-armed lever 6, 7 makes impossible further rotation beyond the set diaphragm opening. Consequently, an important advantage of the illustrated construction is that it makes it possible to hold the preselector ring 3 securely in any desired position without steps and without the use of any additional holding means.

It is apparent that an auxiliary device can be conveniently constructed which will actuate the release of the photographic camera as soon as the surface 10 strikes the right-hand edge of the arm 6 of the two-armed lever. Other variations and modifications can also be made within the scope of the present invention. All such variations and modifications are to be included within the scope of the present invention.

What is claimed is:

1. In an objective for mirror reflex cameras having a preselector ring, the combination of a diaphragm ring, a support carrying said rings, said rings being rotatable upon said support, a two-armed lever swingably mounted upon said preselector ring about an axis which is perpendicular to and intersects the objective axis, a stop carried by said diaphragm ring and adapted to engage one arm of said lever to swing said lever in a clamping direction, the other arm of said lever constituting a cam, a stop carried by said preselector ring and adapted to engage one of the arms of said lever to prevent said lever from swinging in the direction opposite to said clamping direction, and means connected with said support and spaced inwardly from said preselector ring toward said support, said means being adapted to be engaged by the cam arm of the lever when it is swung in said clamping direction to lock said preselector ring, said cam being of such length that it engages said means as the lever swings about its axis, whereby the diaphragm ring is prevented from moving beyond the minimum range limit.

2. In an objective for mirror reflex cameras having a preselector ring, the combination of a diaphragm ring, a support carrying said rings, said rings being rotatable upon said support, a two-armed lever swingably mounted upon said preselector ring about an axis which is perpendicular to and intersects the objective axis, a stop carried by said diaphragm ring and adapted to engage one arm of said lever to swing said lever in a clamping direction, the other arm of said lever constituting a cam, a stop carried by said preselector ring and adapted to engage one of the arms of said lever to prevent said lever from swinging in the direction opposite to said clamping direction, and an annular member carried by said support parallel to and coaxially with said rings and spaced inwardly from said preselector ring toward said support, said annular member being adapted to be engaged by the cam arm of the lever when it is swung in said clamping direction to lock said preselector ring, said cam being of such length that it engages the annular member as the lever swings about its axis, whereby the diaphragm ring is prevented from moving beyond the minimum range limit.

References Cited in the file of this patent

UNITED STATES PATENTS

| | | |
|---|---|---|
| 2,198,454 | Mather | Apr. 23, 1940 |
| 2,269,401 | Steiner | Jan. 6, 1942 |
| 2,580,324 | Schwarz | Dec. 25, 1951 |